Figure 1:
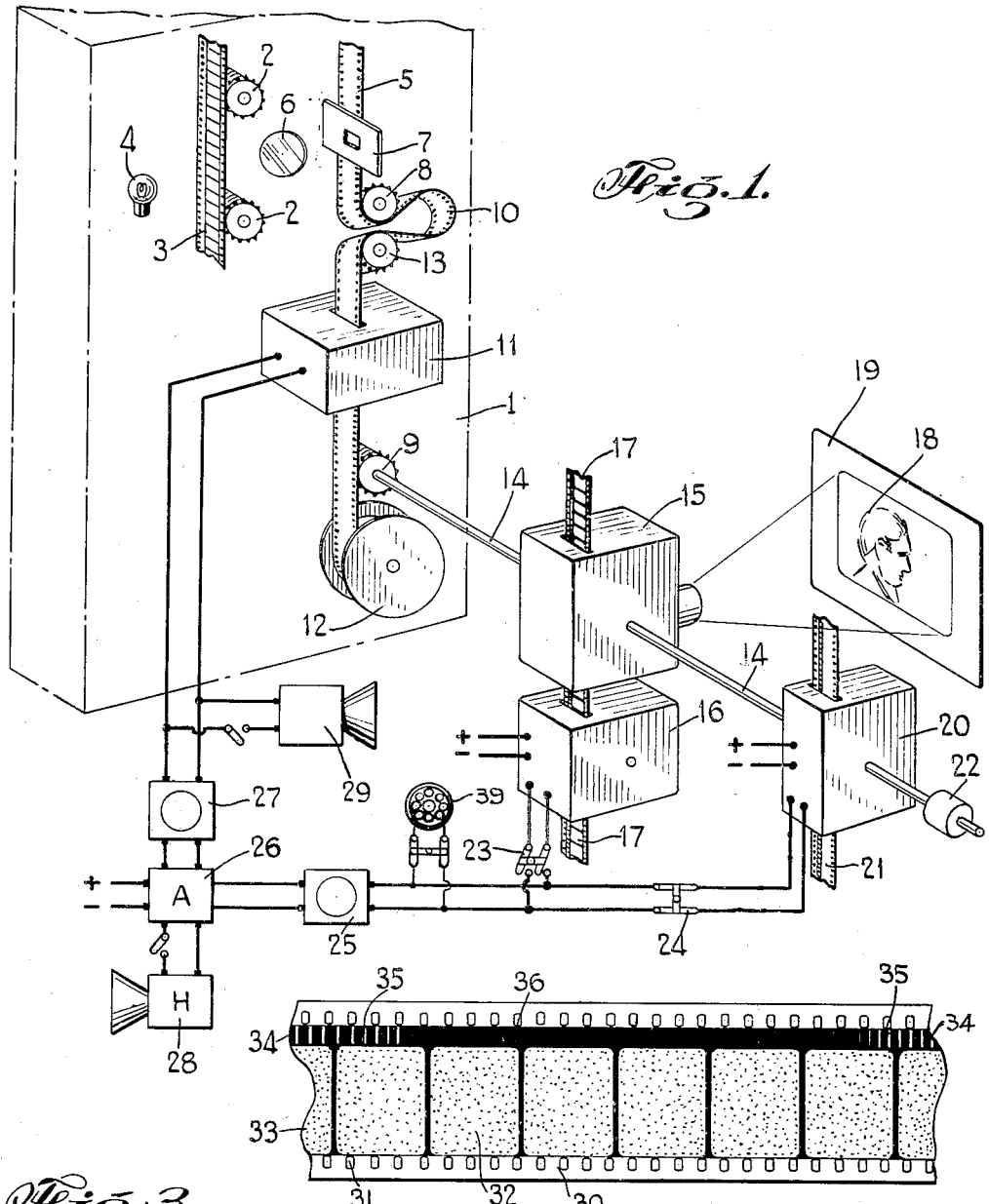

July 20, 1937. O. A. ROSS 2,087,581
SOUND MOTION PICTURE FILM AND SYSTEM FOR PRODUCING THE SAME
Filed Sept. 26, 1932 2 Sheets-Sheet 1

INVENTOR.
Oscar A. Ross.

July 20, 1937.  O. A. ROSS  2,087,581
SOUND MOTION PICTURE FILM AND SYSTEM FOR PRODUCING THE SAME
Filed Sept. 26, 1932  2 Sheets-Sheet 2

INVENTOR.
Oscar A. Ross.

Patented July 20, 1937

2,087,581

UNITED STATES PATENT OFFICE 2,087,581

SOUND MOTION PICTURE FILM AND SYSTEM FOR PRODUCING THE SAME

Oscar A. Ross, New York, N. Y.

Application September 26, 1932, Serial No. 634,888

6 Claims. (Cl. 88—16.2)

This invention refers to what is commercially known as "noiseless recording" onto sound motion picture film and the production of "noiseless" release prints for use in sound motion picture exhibition.

One object of this invention is to furnish novel systems for recording sound onto photographic film for the ultimate purpose of producing noiseless sound motion picture release prints.

Another object is to furnish a novel system for re-recording sound records onto film synchronously with printing picture records thereon.

Another object is to furnish a novel system for exhibiting separated picture and sound films to effect noiseless reproduction of sound during sound motion picture exhibition.

Another object is to furnish a novel form of master negative film for printing noiseless release prints therefrom.

Another object is to furnish a novel form of master positive film for printing a plurality of master negatives or duplicate negatives therefrom.

Another object is to furnish a novel sound motion picture film having positive motion picture images on the picture track and negative sound wave images on the sound track whereby the use of said film during projection will produce normal screen images as the picture images are advanced through the projection light beam, and the sound wave images will produce noiseless reproduction of sound as the sound track is advanced through the sound producing light beam.

Another object is to furnish novel apparatus for electrically re-recording sound onto a film simultaneously with light printing motion picture thereonto.

Another object is to furnish a novel system for exhibiting sound motion pictures with separated sound and picture films and wherein "noiseless" reproduction of the sound is effected during the exhibition.

Another object is to furnish a novel system of recording sound motion pictures wherein originally produced sound and reproduced sound are recorded onto film as super-imposed sound records.

Another object is to furnish a novel method of printing sound motion picture films wherein negative pictures on negative motion picture film and positive sound record images are simultaneously printed onto a positive film for producing "master positive films" for the purposes of printing therefrom "master negative films" from which a number of "release prints" are finally printed.

Another object is to furnish a novel system for producing sound motion picture films, particularly "noiseless master positive films" wherein the picture record is printed thereon from a negative picture film and the sound record is electrically recorded onto said master positive film to produce negative sound wave images on the sound track, said images being transparent and the other portions of the sound track including the spaces between each sound sequence being substantially opaque or black.

Another object is to furnish a novel system for recording sound motion pictures wherein re-recorded sound may be electrically recorded synchronously with the printing of motion pictures without the necessity of adding marginal reference numerals on the picture printing film and sound reproducing film.

Other objects and advantages will be apparent as the description of the invention progresses and the novel features thereof will be pointed out in the appended claims.

In describing the invention in detail, reference is had to the accompanying drawings wherein embodiments thereof are illustrated and wherein like references of character refer to corresponding parts throughout the several views, and in which:—

Figures 2, 3:
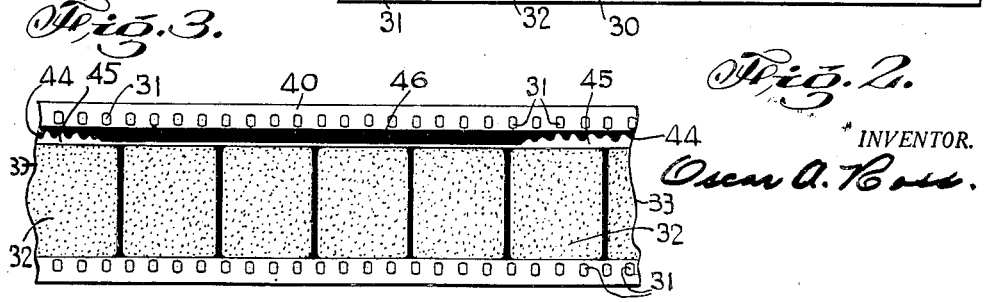
Figure 6:
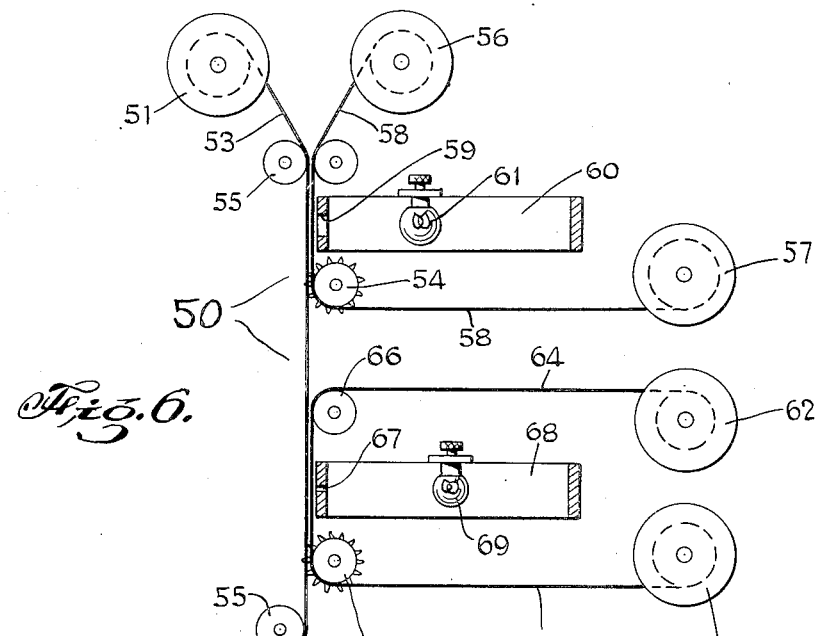
Figure 4:
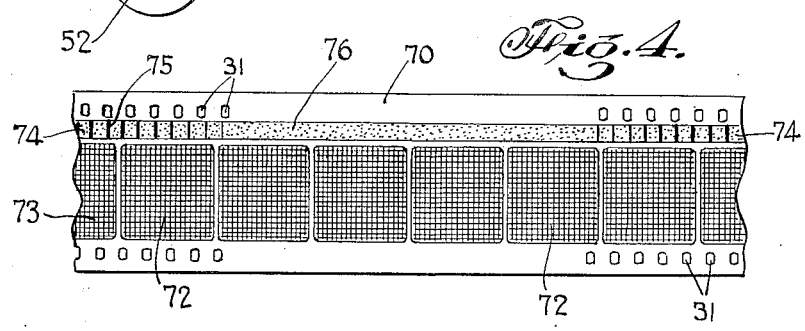
Figure 5:
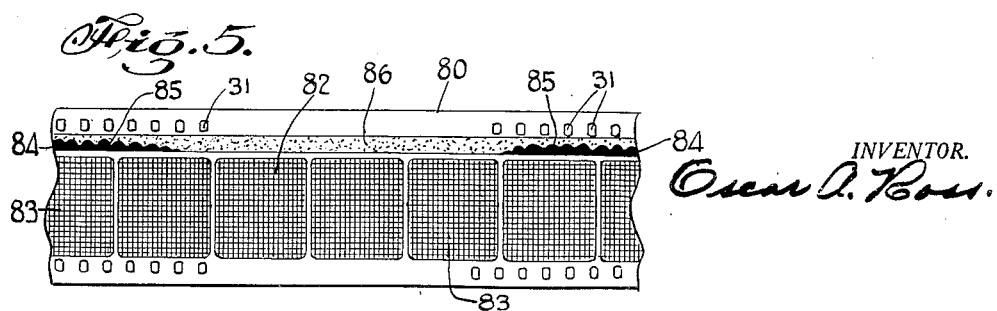

Figure 1 is a diagrammatic view of a recording system and apparatus therefor for producing master positive film and simultaneously effecting exhibition of the sound motion pictures being recorded, and Fig. 2 is a plan view of a "noiseless master positive" and also of a "noiseless release print" of the variable density form sound track, and Fig. 3 is a similar view of similar film having a variable area form of sound track thereon, and Fig. 4 is a plan view of the "noiseless master negative" for producing the film shown in Fig. 2, and Fig. 5 is a plan view of the "noiseless master negative" for producing the film shown in Fig. 3, and Fig. 6 is a diagrammatic view of printing apparatus for ultimately producing "noiseless release prints" by the method of printing.

Referring to Fig. 1, the combined sound recording and film printing unit I comprises the film printing section at the top of said unit having sprockets 2—2 arranged to advance negative picture film 3 through the light beam produced by the light source 4, the pictures on film 3 being optically printed onto light sensitive master positive film 5 through optical system 6 and mask 7, films 3 and 5 being assumed to be intermittently advanced through said light beam by sprockets 2 and 8, the sprocket 9 and loop 10 acting to uniformly advance film 5 through the sound recording unit 11, said unit having a suitable light valve for recording a sound record parallel to the printed picture record as said film is advanced and coiled onto reel 12.

Shaft 14 continuously rotated by motor 22, is arranged to furnish synchronous rotation of the several sprockets for advancing the several films as well as operating the projector 15 having sound head 16 through which the sound motion picture film 17 is advanced for projecting pictures 18 onto screen 19, the sound head 16 having a suitable optical system and light sensitive cell for producing modulated energy impulses in response to the advancement of the sound track portion of film 17 therethrough. Shaft 14 is also arranged to synchronously advance sound film 21 through independent sound head 20, said sound head also having a suitable optical system and light sensitive cell for producing modulated energy impulses in response to the advance of the sound track on said film through said light beam.

The modulated energy impulses produced by the sound heads 16 or 20 are selectively controlled by the switches 23 and 24 and the fader 25 in the flow thereof to the amplifying unit 26 wherefrom said modulated energy impulses flow to recording unit 11 being further controlled by fader unit 27 or the equivalent thereof.

Suitable loud speakers as 28 and 29 are employed for checking the recording amplitude of the modulated energy, or any other form of instruments, or means may be employed for this purpose.

A microphone as 39 may be employed for recording originally produced sound onto film 5 during the printing of the pictures thereonto. Said microphone may also be employed to effect the recording of an originally produced sound as a sound record super-imposed on to re-recorded record being recorded simultaneously therewith.

Film 30 of Fig. 2, may be a "noiseless master positive film" or a "noiseless release print" as far as appearances are concerned, the applicant's methods for producing said films being however quite different one from the other. Said film comprises the usual perforations as 31, the positive image frames 32 on the picture track 33, however the sound track 34 of the variable density form, has negative sound wave images 35 thereon and the sections 36 of said sound track having no sound recorded thereon are substantially black or opaque whereby no light can pass therethrough. In other words the sound wave images or pictures are transparent and the spaces between each of said sound wave images are substantially opaque in this manner reducing the "ground noise" due to "graininess" or dirt particles to a minimum during the reproduction of sound. Whereas during the periods of reproduction of a comparatively large volume of sound, the negative sound wave images will be comparatively large and therefore will transmit a comparatively large amount of light subject to graininess area, the production of the comparatively large volume of sound will so completely mask any "ground noise" produced by "graininess" that, not only will it not be apparent, but in addition, no distortion, or reduction of "faithfulness of reproduction" will be evident during the reproduction of said sound, and since the track sections between the beginning and ending of the sound sequences are substantially opaque whereby no light can pass therethrough, no "ground noise" whatever will be produced during the "silent periods" of sound reproduction.

Film 40 of Fig. 3, is similar to film 30 of Fig. 2, having the perforations 31, picture track 33 with positive picture frames 32, however the sound track 44 is of the variable area form having negative sound records 45 thereon wherein the sound wave images are also transparent, and the sections 46 of the sound track 44 having no sound recorded thereon are opaque or black, as is the case with film 30, of Fig. 2, the film 40 having all the advantages as herein named in describing film 30.

Fig. 4, illustrates the "master negative" film 70 as printed from a "master positive" film 30 of the variable density form, the sound track 74 being positive and the sound wave images, or sound record 75 also being positive images and the nonsound record portion 76 of track 74 being substantially transparent, whereas the pictures 72 on picture track 73 are negative images.

Fig. 5, illustrates the "master negative" film 80 as printed from a "master positive" film 40 of the variable area form, the sound track 84 being positive and the sound wave images, or sound record 85 also being positive images and the nonsound record portions 86 of track 84 being substantially transparent, whereas the pictures 82 on picture track 83 are negative images.

In the production of positive release prints for projecting sound motion pictures, it is customary to first produce a continuously non-spliced "master positive film" complete in all respects for exhibition, and from said master positive film, it is further customary to print a number of "duplicate negatives" more generally known as "dupe" negatives for distribution to film processing laboratories in the particular districts wherefrom positive release prints are to be distributed for exhibition purposes. Fig. 1 refers more particularly to the production of such "master positives" and more particularly to the form thereof now known as "noiseless master positive films" for sound motion picture exhibition.

Referring to Fig. 1, the negative film 3 may be a sound motion picture film having both picture and sound records thereon as, for example, films 70 or 80, or may be negative film having a picture record solely thereon, is arranged to optically print said negative picture record onto the picture track as a positive image thereon as film 5 is advanced through the light beam produced by the light source 4 and thereafter said film 5, is advanced through the sound recording camera, or unit 11 wherein a negative sound record is recorded onto a negative sound track positioned parallel to the positive picture track, in other words, positive images of the motion picture action are recorded onto the picture track and negative images of the sound waves are recorded onto the sound track of film 5 as said film is advanced, the picture and sound records being preferably displaced 14½ inches longitudinally of the film in accordance with present accepted standards of synchronously recording action and sound onto sound motion picture film for exhibition purposes.

The sound motion picture film 17 advanced through projector 15 and sound head 16, may be a film having a positive image picture track and a negative image sound track, as films 30 or 40, or may be a film whereon both the picture and sound wave images are positive as at present, and if a film as 30 or 40, it may be desired to modify the sound record thereon by re-recording for producing a more acceptable sound record for reproduction. As the sound record track of film 17 is advanced through sound head 16, the modulated energy produced thereby for recording the negative sound record onto film 5, may be varied by the faders 25 or 27, or by the amplifying unit 26, as desired.

In event the sound head 20 is to be employed for re-recording, the sound film 21 may have either negative or positive sound wave images thereon, preferably negative images, or a negative sound track, since as hereinbefore pointed out the "ground noise" incident to the reproduction of the sound record on film 21 as modulated energy, will be minimum as recorded by the recording unit 11. It is to be understood that the films 3, 5, 17, and 21 are all advanced synchronously and that the film 21 is reproducing sound synchronously with the projected pictures 18 on screen 19 correlated thereto.

It is also to be observed that in projecting the pictures 18 and reproducing the sound on film 21 simultaneously therewith through loud speakers as 28 and 29, the action of said pictures may be synchronized with the reproduced sound as produced by said speakers for synchronously recording the sound and action onto the film 5, in this manner avoiding the necessity of placing marginal numerals on said films 17 and 21 for the purpose of synchronizing said action and sound.

Referring to Fig. 6, the printing apparatus 50 comprises light sensitive film feed reel 51 and take-up reel 52 supporting light sensitive film 53 advanced by sprocket 54 and guided by rollers 55. Said apparatus also comprises picture negative film feed reel 56 and take-up reel 57 supporting picture negative picture film 58, the sprocket 54 being arranged to advance films 53 and 58 synchronously over light aperture 59 formed in light box 60 having light source 61. Said apparatus also includes positive sound film feed reel 62 and take-up reel 63 supporting positive sound film 64 advanced by sprocket 65 and guided by spool 66, said film being advanced over light aperture 67 formed in light box 68 having light source 69.

The operation of printing apparatus and the method of printing is as follows. As light sensitive film 53 is advanced over light aperture 59, the negative pictures on film 58 print positive pictures onto light sensitive film 53 along one edge portion of said film, and as said light sensitive film advances over the light aperture 67, the positive image sound film 64 prints a negative image of the positive sound record thereon onto said light sensitive film 53 along the other edge portion of said light sensitive film and when said light sensitive film is developed it will appear as the films 30 or 40 depending upon whether the sound film 64 has variable density or variable area sound recording thereon. Such a film 53 when developed is more generally known as a "master positive film" from which a number of "dupe negative films" are printed for distribution to film processing laboratories, the peculiar and unique features of film 53 being that whereas the picture track thereon has positive picture images recorded thereon, the sound track parallel thereto has negative sound wave images recorded thereon in this manner producing opaque portions on the sound track at all points wherein sound wave images do not occur including all spaces on said sound track having no sound recorded thereon. It is obvious that release prints printed from a master negative film which has been produced by printing from said master positive film 53 will appear substantially as said master positive film 53, namely they will have positive picture records and negative sound records thereon.

The peculiar manner of producing "noiseless release prints" as described herein is still another means for producing such prints over the means described in my co-pending application Serial No. 236,980, filed December 1st, 1927.

Whereas the projector 15 is shown as advancing a sound motion picture film as 17, said film may have pictures recorded solely thereon correlated to the sound recorded onto film 21 advanced through sound head 20 and in which instance suitable synchronizing mechanism, as for example that disclosed in my co-pending application Ser. No. 311,126, filed October 8th, 1928, may be added to sound head 20 for advancing said films relatively during the synchronous advancement thereof.

Whereas the "master positive films" and "release prints" are shown as having only variable density and variable area forms of sound recording, said recording may be of the linear form as shown by Fritts Patents 1,203,190 and 1,203,191, and wherein the negative sound track on said master positive film will appear substantially opaque between the margins thereof, the sound record appearing as a transparent line of sinusoidal form, the spaces between sound record sequences being substantially opaque or black in character.

Whereas in Figs. 1 and 6, the positive pictures and negative sound record are shown as simultaneously impressed onto the light sensitive film 5, they may be independently recorded thereon at differing times and other forms of recording apparatus may be employed for so doing.

By the term "noiseless" as expressed herein, is meant the substantial elimination of "ground noise" or undesirable noise or sound other than the "signal" or recorded sound which it is desired to reproduce during exhibition.

By the term "sound sequence" as expressed herein, is meant a period of continuity of sound, such as for example a phrase, sentence or utterance of sound, or a detached phrase or interval of music, or incidental sound which may be recorded onto a sound track. A sound sequence may be identified on a sound track by a space on the track having a length greater than the space between two wave images of a frequency as low as capable of being recorded by the particular apparatus by which said sound record was recorded.

Another manner of printing positive picture records onto light sensitive film parallel to negative records corresponding to sound is also disclosed in my copending application Serial Number 386,663, filed August 17, 1929.

"Noiseless" negative sound records of the character shown herein, and a manner of producing the same, are also disclosed in my copending application Serial Number 306,652, filed Sept. 18th, 1928.

What I claim is:—

1. In a system for producing sound motion pictures, a plurality of developed picture films, a developed sound film, a light sensitive film having picture and sound tracks, means for advancing all the films synchronously, means for printing the pictures of one of the picture films onto the picture track of the light sensitive film as they advance, means for projecting the pictures of another developed picture film for observation simultaneously with the printing of the pictures, means including a light source projected onto the developed sound film for producing electrical oscillations corresponding to the sound recorded thereon as the film advances, means responsive to the electrical oscillations for reproducing sound corresponding to the sound record on the sound film, means also responsive to the electrical oscillations for photographically rerecording the record of the sound film onto the sound track of the light sensitive film and means for advancing the developed sound film relatively to the other films for synchronizing the recorded sound and the printed pictures on the light sensitive film when observing the projected pictures and the reproduced sound printed thereonto, the correlation being determined by jointly observing the projected pictures and the reproduced sound.

2. The method of producing sound motion picture films which involves, simultaneously advancing a plurality of similar developed picture films, a developed sound film including a sound record track, and a light sensitive film including both picture and sound tracks, printing the picture of one of the developed picture films onto the picture track of the light sensitive film as the films advance, projecting the pictures of another developed picture film for observation, producing electrical oscillations corresponding to the sound recorded on the developed sound film in the response to the advancement thereof, producing additional electrical oscillations corresponding to auxiliary sound produced from observing the projected pictures, and utilizing all the oscillations for electrophotographically recording a composite record of sound onto the sound track of the light sensitive film in correlation to the printed pictures thereon.

3. The method of producing sound motion picture films which involves, simultaneously advancing a plurality of similar developed picture films, a developed sound film and a light sensitive film including both picture and sound tracks, printing the pictures of one of the developed picture films onto the picture track of the light sensitive film, projecting the pictures of another developed picture film for observation, producing electrical oscillation corresponding to the sound record on the developed sound film in response to the advancement thereof, utilizing the electrical oscillations for reproducing sound for observation, observing the reproduced sound and the projected pictures for synchronizing the advancement of the printing picture film and the developed sound film, and further utilizing the electrical oscillations for photographically recording a sound record onto the sound track of the light sensitive film in correlation to the printed pictures thereon.

4. The method of producing sound motion picture films which involves, simultaneously advancing a plurality of similar developed picture films, a developed sound film and a light sensitive film having picture and sound tracks, printing the pictures of one of the picture films onto the picture track of the light sensitive film, projecting the pictures of another picture film in correlation to the printing of the pictures for observation, electro-photographically rerecording the sound record of the sound film onto the sound track of the light sensitive film, producing auxiliary sound while observing the projected pictures, and electro-photographically recording the auxiliary sound onto the sound track of the light sensitive film in superimposition over the rerecorded record thereon.

5. The method of producing sound motion picture films which involves, simultaneously advancing a plurality of similar developed motion picture films, a developed sound film and a light sensitive film having parallel picture and sound tracks, printing the pictures of one of the picture films onto the picture track of the light sensitive film, projecting the pictures of another picture film in correlation to the picture printing for observation, producing electrical oscillations corresponding to the sound recorded on the sound film in response to the advancement thereof, utilizing the oscillations for rerecording a record of the sound onto the sound track of the light sensitive film, producing auxiliary sound by observing the projected pictures, and electro-photographically recording the auxiliary sound onto the sound track of the light sensitive film in superimposition to the rerecorded sound record thereon.

6. In a system for producing sound motion picture films, a developed motion picture film, a plurality of developed sound films, a light sensitive film having picture and sound tracks, means for advancing the films simultaneously, means for printing the pictures of the picture film onto the picture track of the light sensitive film, means including a light source for rerecording the sound record of the sound film onto the sound track of the light sensitive film, and means for advancing the sound films relatively one to the other and relatively to the picture and light sensitive films.

OSCAR A. ROSS.